(12) United States Patent
Nagao

(10) Patent No.: US 7,452,093 B2
(45) Date of Patent: Nov. 18, 2008

(54) PRISM SHEET AND DISPLAY DEVICE USING THE SAME

(75) Inventor: Kimitoshi Nagao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 253 days.

(21) Appl. No.: 11/210,668

(22) Filed: Aug. 25, 2005

(65) Prior Publication Data

US 2006/0050200 A1 Mar. 9, 2006

(30) Foreign Application Priority Data

Aug. 26, 2004 (JP) ............. P. 2004-246267
Feb. 14, 2005 (JP) ............. P. 2005-035730

(51) Int. Cl.
*G09F 13/04* (2006.01)
*F21V 7/04* (2006.01)
*F21V 7/00* (2006.01)
*F21V 5/02* (2006.01)
*F21V 5/00* (2006.01)

(52) U.S. Cl. ............. 362/97; 362/620; 362/626; 362/328; 362/309; 362/339

(58) Field of Classification Search ............. 362/620, 362/626, 97, 302, 309, 339, 328, 333, 304, 362/297, 346

See application file for complete search history.

(56) References Cited

U.S. PATENT DOCUMENTS

| | | | | |
|---|---|---|---|---|
| 2,124,417 A | * | 7/1938 | Hamel et al. | 362/309 |
| 2,877,342 A | * | 3/1959 | Beach | 362/309 |
| 3,020,395 A | * | 2/1962 | Peltz | 362/330 |
| 3,668,381 A | * | 6/1972 | Schwartz et al. | 362/339 |
| 3,725,697 A | * | 4/1973 | Wince | 362/294 |
| 5,160,192 A | * | 11/1992 | Sugawara | 362/16 |
| 5,490,049 A | * | 2/1996 | Montalan et al. | 362/240 |
| 6,185,357 B1 | * | 2/2001 | Zou et al. | 385/133 |
| 6,669,350 B2 | * | 12/2003 | Yamashita et al. | 362/612 |
| 7,192,166 B2 | * | 3/2007 | Shimura | 362/331 |
| 7,270,454 B2 | * | 9/2007 | Amano | 362/522 |
| 2005/0286251 A1 | * | 12/2005 | Smith | 362/327 |

FOREIGN PATENT DOCUMENTS

JP 8-262206 A 10/1996

* cited by examiner

*Primary Examiner*—Y My Quach Lee
*Assistant Examiner*—David J Makiya
(74) *Attorney, Agent, or Firm*—Sughrue Mion, PLLC

(57) ABSTRACT

A prism sheet for emitting an incident light in an even distribution state of light quantity even in the case of using an irradiating light source such as a point light source having an emission of narrow band. A display device for deflecting and displaying the light from the light source evenly and efficiently without deteriorating the display quality by applying the prism sheet thereto.

A prism sheet for deflecting and emitting a light introduced into a transparent substrate, with a prism formed on the substrate. The prism sheet includes: a circular prism having a plurality of annular grooves arrayed concentrically from a center axis; and a radial prism having a plurality of straight grooves arrayed radially from the center axis.

1 Claim, 13 Drawing Sheets

PRISM SHEET AND DISPLAY DEVICE USING THE SAME

This application is based on Japanese Patent application JP 2004-246267, filed Aug. 26, 2004, and JP 2005-035730, filed Feb. 14, 2005, the entire contents of which are hereby incorporated by reference. This claim for priority benefit is being filed concurrently with the filing of this application.

BACKGROUND OF THE INVENTION

1. Technical Field of the Invention

The present invention relates to a prism sheet to be used as a display device such as a mobile PC, a PDA, a mobile telephone, a note/desktop PC, a cash dispenser terminal of a bank, or a liquid crystal TV, and a display device using the prism sheet.

2. Description of the Related Art

In the liquid crystal display device of the related art, a diffusion plate and two prism sheets are arranged over a backlight optical guide plate thereby to condense the light from the optical guide plate onto a liquid crystal layer.

The prism sheet is formed by arraying a plurality of prism lenses along one axial direction on one face of a transparent substrate or by making the axial directions of the prism lenses orthogonal to each other on the two faces of a transparent substrate. A various shapes are known as the shapes of those prism lenses such as the regular arrangements of triangular roof shapes, sine-wave shapes or other shapes, or the irregular sizes of the individual prisms. In JP-A-8-262206(hereafter "JPA '206"), the prism sheet, in which concave-convex pattern are formed on the two faces of the surface and the back of a prism sheet and in which the directions of the ridges of the prisms are extended orthogonally of each other on the surface and back of the sheet, is described as one example of the prism sheet of the related art.

A prism sheet 100 disclosed in JPA '206 condenses a light in planes normal to the ridges of the individual prisms of the surface and the back. An example, in which the prism sheet 100 is applied to the display device, is shown in FIG. 13. According to this display device, a light 102 emitted from a light source 101 is reflected on a lamp reflector 103 and fed to an optical guide plate 104. Then, the light extracted from the optical guide plate 104 enters the prism sheet 100 and is refracted and reflected on the lower side prism and further on the upper prism. The light is emitted in the condensed state and then enters a liquid crystal panel 105. Moreover, the individual pixels 106 of the liquid crystal panel are displayed by using the light from the prism sheet 100 as a back light.

In JPA '206, however, the prisms are regularly arrayed to form the Moire fringe (or the interference fringe) easily between themselves and the cells of a liquid crystal or the like, and are defective in the reduction in the display quality. Moreover, the prism lenses are arranged in parallel so that the uneven quantity of light is hard to occur in case the light source is linear or facial. In case, however, the light source has spotted, disc-shaped or spherical shapes, the defect is that the light quantity is liable to become uneven around the position of the light source.

SUMMARY OF THE INVENTION

The present invention has been conceived in view of the background thus far described and has a first object to provide a prism sheet capable of emitting an incident light in an even distribution state of light quantity even in the case of using an irradiating light source such as a point light source having an emission of narrow band. A second object is to provide a display device for condensing the light from the light source or the optical guide plate evenly and efficiently without any deterioration in the display quality due to the Moire fringe or the flatness of the display unit in case the prism sheet is applied to the display device.

The above-specified objects are achieved by the following structure.

(1). A prism sheet for deflecting and emitting light introduced into a transparent substrate, comprising:
a transparent substrate;
a circular prism formed on the transparent substrate, the circular prism having a plurality of annular grooves arrayed concentrically from a center axis; and
a radial prism formed on the transparent substrate, the radial prism having a plurality of straight grooves arrayed radially from the center axis.

According to this prism sheet, the light from the light source is introduced from the circular prism and is radially diffused while being refracted in the plural annular grooves and further diffused by the straight grooves of the radial prism. As a result, an even distribution state of liquid quantity having no periodicity of the intensity of the transmitted light is obtained when the light from the light source passes through the annular grooves of the circular prism and emits from the straight grooves of the radial prism. As a result, the light from the light source can be given an even light quantity distribution without causing no even light quantity around the position of the light source.

(2). The prism sheet according to (1),
wherein the transparent substrate is provided with the circular prism on one face thereof and with the radial prism on other face thereof.

According to this prism sheet, the circular prism and the radial prism are formed integrally with the transparent substrate so that the sheet can be thinned to simplify the manufacturing process. By reducing the junction interface, moreover, the attenuation of light due to the useless reflection/scattering can be prevented to improve the light utilizing efficiency.

(3). The prism sheet according to (1),
wherein the transparent substrate includes at least a first substrate and a second substrate, the first substrate is provided with the circular prism on a surface thereof and the second substrate is provided with the radial prism on a surface thereof, and wherein the first substrate and the second substrate are laid one over the other.

According to this prism sheet, one substrate having the circular prism formed and the other substrate having the radial prism are integrated by jointing them by adhering or depositing means.

As a result, the works for forming the circular prism and the works for forming the radial prism can be separated so that the individual steps can be simplified to lower the manufacturing cost.

(4). The prism sheet according to any one of (1) to (3),
wherein the prisms are formed by carving the surfaces of the transparent substrate.

According to this prism sheet, the circular prism and the radial prism are individually carved in the surface of the transparent substrate. As compared with the case in which other parts formed by adhering the prisms to the substrate surface are integrally assembled, the deviation of the optical axis can be minimized to deflect the light precisely in a predetermined direction.

(5). The prism sheet according to any one of (1) to (4),
wherein apexes of patterns formed on the prisms are arranged in a common plane.

According to this prism sheet, the apexes of the pattern in the plane having the circular prism formed and the apexes of the pattern in the plane having the radial prism formed are arranged in the planes parallel to each other. As a result, the prism sheet is neither sloped nor displaced, when assembled, from the mating member so that the light from the light source can be precisely deflected.

(6). The prism sheet according to any one of (1) to (5),
wherein the circular prism has a predetermined prism apex angle, and a predetermined arrangement pitch in a radial direction of the annular grooves.

(7). The prism sheet according to (6), wherein the predetermined arrangement pitch has a synchronism of about 5 μm to 500 μm.

(8). The prism sheet according to (6), wherein the predetermined apex angles is of from 45° to 150°.

According to this prism sheet, the effect to diffuse the light from the light source into a substantially light quantity distribution by the annular grooves can be applied to the light sources of various kinds.

(9). The prism sheet according to any one of (1) to (8),
wherein the radial prism has a predetermined prism apex angle, and wherein a depth of the straight grooves varies from a center to a radially outer side.

(10). The prism sheet according to (9), wherein the depth become deeper toward a radially outward of the center axis.

According to this prism sheet, the light can be so deflected by the straight grooves having a depth varied in the radial direction from the center that the light quantity of the transmitted light may be even in the radial direction.

(11). The prism sheet according to any one of (1) to (10),
wherein at least one of the prisms has grooves in a sine-wave shape.

(12). The prism sheet according to any one of (1) to (10),
wherein at least one of the prisms has grooves in a trapezoidal shape.

(13). The prism sheet according to any one of (1) to (10),
wherein at least one of the prisms has grooves in a semicircular shape.

(14). The prism sheet according to any one of (1) to (10),
wherein at least one of the prisms has grooves formed by rounding triangular apexes.

The prism sheet may be formed to have such various kinds of grooves in accordance with the environment.

(15). A display device comprising:
a light source;
a prism sheet according to any one of (1) to (14) and having the center axis aligned with an optical axis of the light source; and
an array of transmission type optical modulation elements arranged on a light emission side of the prism sheet for modulating light emitted from the prism sheet.

According to this display device, the light from the light source is introduced from the circular prism and is annularly diffused while being refracted in the plural annular grooves and further diffused in the radial direction by the straight grooves of the radial prism. Therefore, an even distribution state of liquid quantity having no periodicity of the intensity of the transmitted light is obtained when the light passes through the annular grooves of the circular prism and emits from the straight grooves of the radial prism. As a result, the light from the light source can be given an even light quantity distribution without causing no even light quantity around the position of the light source.

(16). The display device according to (15),
wherein a plurality of the light source are arranged, and pairs of the circular prism and the radial prism are assembled with each of the plural light source.

According to this display device, the lights from the plural light sources are individually introduced into the circular prism and the radial prism and are diffused and emitted by the individual annular grooves and straight grooves so that the even light quantity distribution state having no periodicity in the quantity of transmitted light can be obtained to perform an even satisfactory image display.

(17). The display device according to (15) or (16), further comprising:
a reflecting member including a plurality of circular reflecting faces arrayed concentrically from a center line for reflecting light from the light source arranged on the center axis, on the circular reflecting faces thereby to introduce the reflected lights into the prism sheet,
wherein the reflecting member is arranged on an opposite side of the prism sheet with respect to the light source.

According to this display device, the light emitted from the light source in the opposite direction to the prism sheet or the light reflected by the prism sheet is reflected by the reflecting member so that it enters the prism sheet. Therefore, the light from the light source can be introduced without any waste into the prism sheet. As a result, the utilizing efficiency of the light can be improved to improve the brightness of the display device without enhancing the brightness of the light source thereby to provide a display device having an excellent visibility.

(18). The display device according to (17),
wherein the reflecting member includes inner annular slopes and outer annular slopes for forming a plurality of annular ridgelines concentrically from a center of a curvilinearly recessed substrate,
wherein the inner annular slopes are formed to reflect the light emitted from the light source into substantially collimated lights, and
wherein the outer annular slopes are formed substantially in parallel with an emission optical path from the light source.

According to this display device, the light emitted from the light source is reflected not on the outer annular slopes but on the inner annular slopes so that it becomes substantially collimated lights. As a result, the light emitted from the light source is made parallel over a wide range without any waste so that the collimated lights enter the prism sheet in the substantially perpendicular direction. Thus, the even light quantity distribution state can be established to perform an even satisfactory image display.

According to the prism sheet of the invention, even in the case of using the irradiating light source having a narrow luminous area like a spotted light source, the incident light can be emitted in the even light quantity distribution state. In case, moreover, this prism sheet is applied to the display device, the reduction in the display quality is not caused by the Moire fringe or the deterioration in the flatness of the display unit so that the light from the light source or the optical guide plate can be condensed evenly and efficiently into the optical modulation array or the like thereby to improve the utilizing efficiency of the light.

BRIEF DESCRIPTION OF THE DRAWINGS

FIGS. 1A and 1B present views showing prism sheets of one embodiment of the invention, of which FIG. 1A is a perspective view of an exterior taken from the upper side, and FIG. 1B is a perspective view taken from the lower side;

DETAILED DESCRIPTION OF THE INVENTION

Preferred embodiments of a prism sheet according to the invention and a display device using the prism sheet will be described in detail with reference to the accompanying drawings.

First Emboidment

First of all, a first embodiment of the prism sheet according to the invention is described with reference to FIG. 1A to FIG. 7.

Figure 1A:
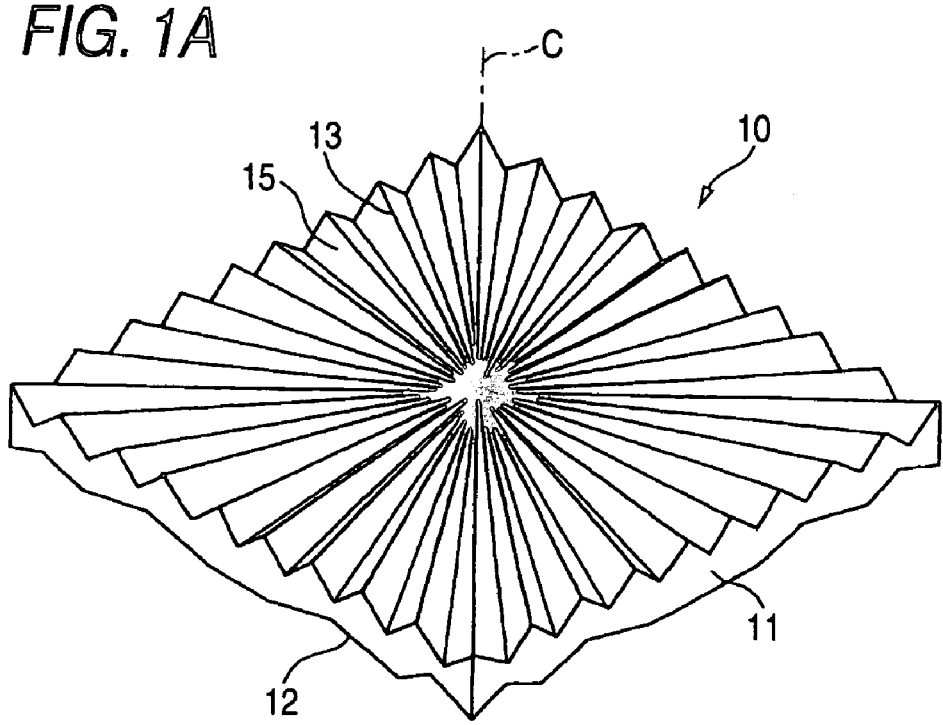
Figure 1B:
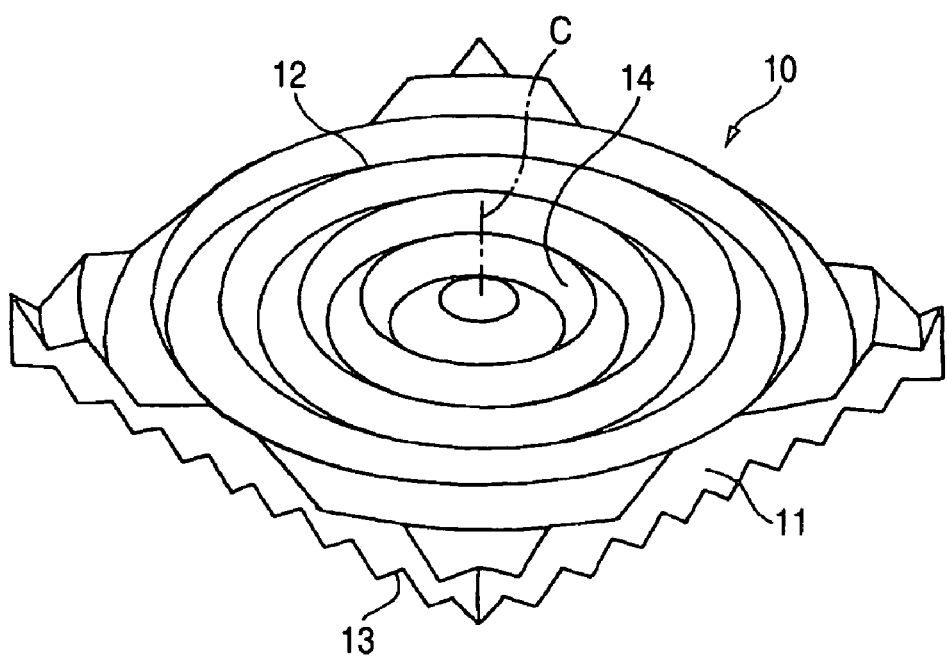
Figure 2:
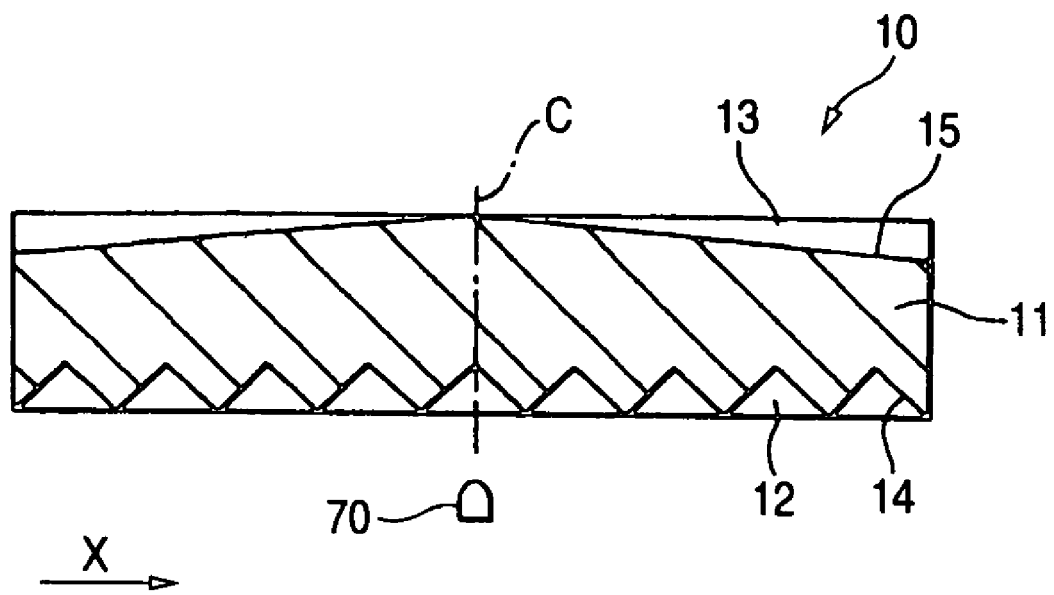
FIG. 2 is a sectional view containing the center axis of the prism sheet shown in FIGS. 1A and 1B.

FIGS. 1A and 1B present views showing a prism sheet of this embodiment, of which FIG. 1A is a perspective view of an exterior taken from the upper side, and FIG. 1B is a perspective view taken from the lower side, and FIG. 2 is a sectional view containing the center axis of the prism sheet shown in FIGS. 1A and 1B.

In prism sheet 10, as shown in FIGS. 1A and 1B, a light introduced into a transparent substrate 11 is deflected and emitted by prisms formed in the transparent substrate 11. Specifically, the prism sheet 10 includes: a circular prism 12 arranged on one side or the back of the transparent substrate 11; and a radial prism 13 arranged on the other face or the surface of the transparent substrate 11.

The transparent substrate 11 is molded of glass, plastics (e.g., polycarbonate, acryl or the like) or the like, and this material used has a high transparency and rich flatness/moldability.

On the back and surface of the transparent substrate 11, there are formed the circular prism 12 and the radial prism 13. In the circular prism 12, there are arrayed a plurality of annular grooves 14 concentrically from a center axis C, to form a corrugated pattern on the transparent substrate 11. These annular grooves 14 are carved in the back of the transparent substrate 11 so that they are integrated with the transparent substrate 11. As shown in FIG. 2, the prisms (or ridges) are set to have a predetermined apex angle, and the annular grooves 14 are arranged to have a predetermined pitch with respect to the radial direction. The arrangement pitch of the annular grooves 14 with respect to the radial direction is substantially equal to the pixel size of a liquid crystal panel or the like to be combined therewith and has a synchronism of about 5 μm to 500 μm, for example. Moreover, the annular grooves 14 are formed into such a triangular roof shape that the apexes of the corrugated pattern are individually arranged in a common plane and have an apex angles α of 45° to 150°.

In the radial prism 13, on the other hand, there are arrayed a plurality of straight grooves 15 in alignment with and radially from the center axis C of the annular grooves 14 of the circular prism 12, thereby to form the corrugated pattern. The straight grooves 15 are so carved in the surface of the transparent substrate 11 that they are integrated with the transparent substrate 11 to have a predetermined apex angle, and that they become the deeper toward the radially outward of the center axis C. In the straight grooves 15, moreover, the apexes of the corrugated pattern are individually arranged in the common plane, and the two faces of the surface and the back of the prism sheet 10 are made parallel to each other.

It is preferred that the thickness of the prism sheet 10 is made necessary the least. If the pitch of the circular/radial prism lens has a pitch (as represented by the pitch in the maximum circumference in the case of the radial prism) p and an apex angle α, the depth dP of the grooves of the prism is expressed by the following Equation:

$$dP = (p/2)/\tan(\alpha/2).$$

Between the prism lenses of the two faces, there is needed a base portion for keeping the strength. The thickness db is desirably the less so as to avoid the vignette of the displayed image and the reduction in the contrast. The thickness is within the following range with respect to the prism lens pitch p:

$$0.2p \leq db \leq 3p.$$

Preferably, the thickness dp is within the following range:

$$0.2 \leq db \leq p.$$

The total thickness d tot of the prism sheet including the groove portions of the two faces and the base portion of the prism lens and is expressed by the following Equation:

$$d\,tot = 2 \times dp = p/\tan(\alpha/2) + db.$$

The preferred range of this thickness d tot is made different by the prism lens apex angle α and the prism lens pitch p, and is exemplified by values in the following cases:

in the case of α=90° and p=50 μm: d tot=60 to 100 μm;
in the case of α=60° and p=50 μm: d tot=97 to 137 μm; and
in the case of α=60° and p=50 μm: d tot=39 to 79 μm.

In the mode of utilizing such prism sheet 10, a light source 70 is so arranged on the lower side of the circular prism 12 as to have its optical axis aligned with the center axis C. The light emitted from the light source 70 is refracted and guided into the transparent substrate 11 by the annular grooves 14 of the circular prism 12 and is then refracted and emitted by the straight grooves 15 of the radial prism 13. In order to diffuse the light from the light source toward the prism lens, a diffusing plate may also be disposed on the light source side of the prism lens. In order to reflect the light from the light source or to utilize the light reflected from the prism lens, a reflecting plate or a diffusing plate pay also be disposed on the back side (or on the opposite side of the prism lens) of the light source.

Figure 3A:
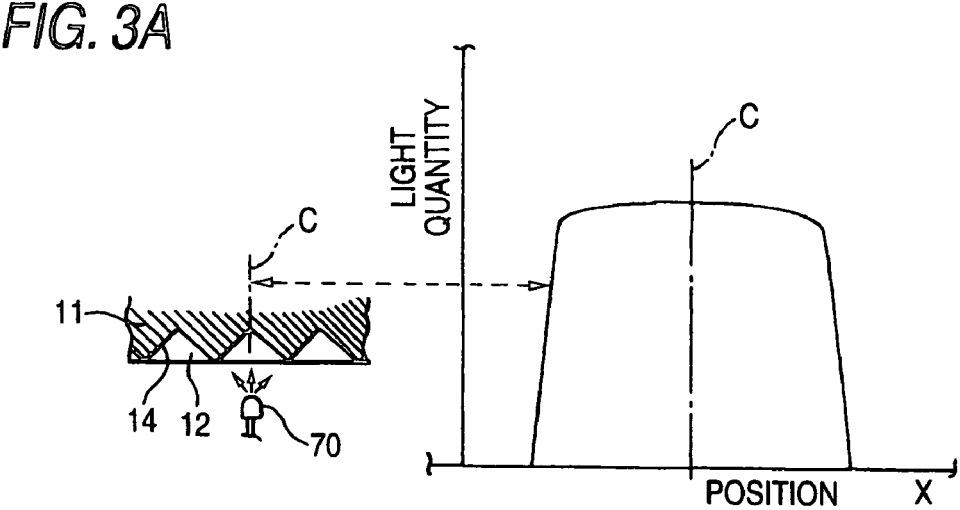
FIGS. 3A and 3B present characteristic diagrams of the quantities of transmitted lights of the prism sheet shown in FIGS. 1A and 1B.
Figure 3B:
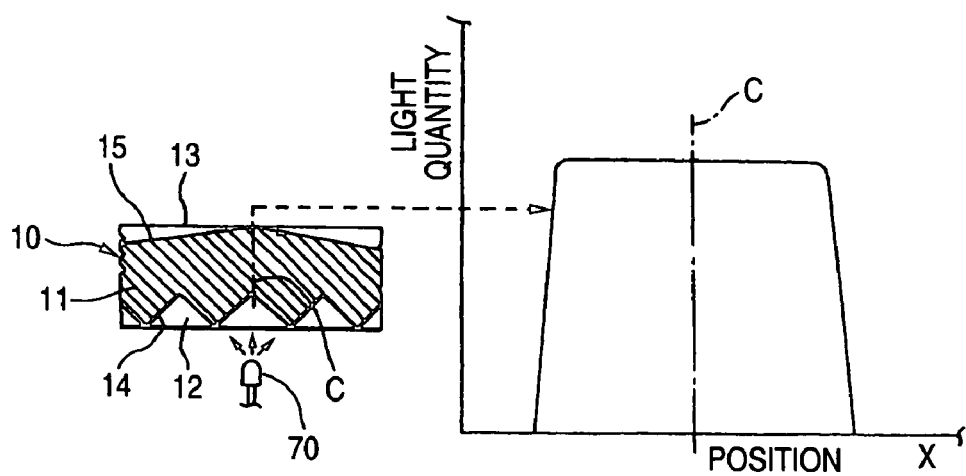

Here is described the optical characteristics of the prism sheet 10 with reference to FIGS. 3A and 3B.

As shown in FIG. 3A, the light emitted from the light source 70 is refracted into the transparent substrate 11 by the annular grooves 14 of the circular prism 12. The light incident at this time on the inside of the transparent substrate 11 has an even quantity of light along the circumferential direction of the annular grooves 14 of the circular prism 12. In the radial direction of the annular grooves 14, however, the quantity of light has a dispersion with respect to the center axis C in accordance with the arrangement pitch of the annular grooves 14. This dispersion is caused by the corrugated pattern of the circular prism 12.

Without the prism lens, the drop in the light quantity is the higher toward the periphery. If the circular prism lens is used, however, the light to expand in the radial direction in the periphery can be condensed in a direction normal to the display face so that the light quantity in the periphery can be reduced in its drop and brought closer to an even value.

Moreover, the radial prism lens can condense the light having a distribution to expand along the circle (or in the circumferential direction), in direction normal to the display screen, so that the effect to improve the brightness in the direction normal to the display screen can be obtained in addition to the effect of condensing the circular prism lens.

As shown in FIG. 3B, the light introduced into the transparent substrate 11 and transmitted through the circular prism 12 is refracted by the straight grooves 15 of the radial prism 13 and emitted upward of the prism sheet 10. The emitted light at this light is homogenized in its quantity along the radial direction so that the dispersion of the light quantity, as shown in FIG. 3A, is eliminated.

As a result, in case the light source is arranged on the back side of the prism sheet 10 whereas the liquid crystal panel s arranged on the surface side, the liquid crystal panel can be irradiated with the light in an even light quantity distribution state so that the image can be displayed in a high quality of no uneven light quantity.

Here are described modifications of the circular prism 12 and the radial prism 13 in the prism sheet 10.

FIGS. 4A to 4D presents sectional views showing individual modifications of the prism in the prism sheet shown in FIG. 1. Here, the prism of the prism sheet is exemplified by the circular prism 12 and the radial prism 13, the former of which is described herein. In other words, the following modification can also be naturally applied to the radial prism 13.

Figure 4A:
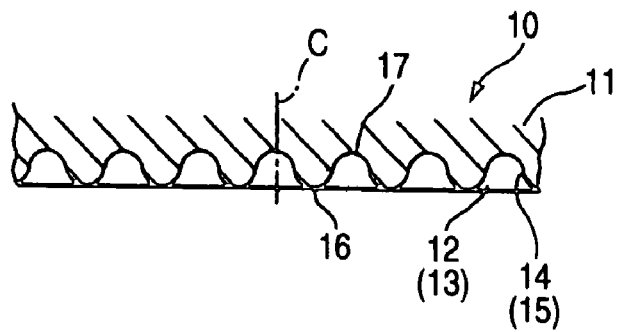
FIGS. 4A to 4D present sectional views showing modifications of circular prisms of the prism sheet.

FIG. 4A shows an example, in which the annular grooves 14 of the circular prism 12 are formed in a sine-wave shape. The corrugated pattern of the annular grooves 14 in this case is composed of ridges 16 and troughs 17, which are arranged smoothly and regularly.

Figure 4B:
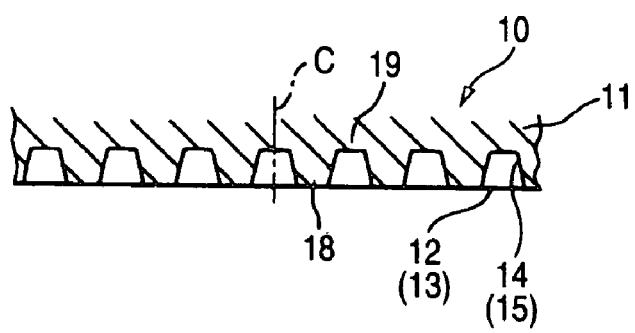

FIG. 4B shows an example, in which the annular grooves 14 of the circular prism 12 are formed in a trapezoidal shape. The corrugated pattern of the annular grooves 14 in this case is composed of rectangular ridges 18 and troughs 19.

Figure 4C:
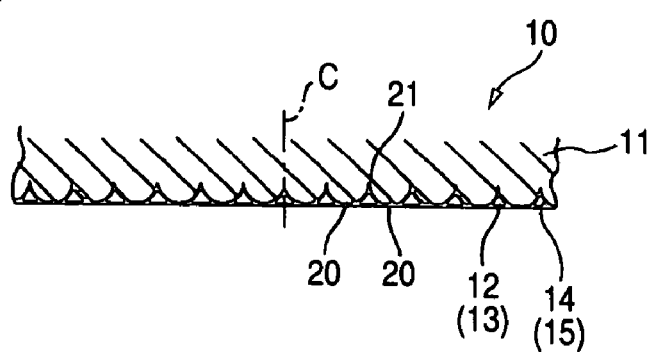

FIG. 4C shows an example, in which the annular grooves 14 of the circular prism 12 are formed in a semicircular shape. The corrugated pattern of the annular grooves 14 in this case is composed of semicircular ridges 20 and troughs 21 between the adjoining ridges 20.

Figure 4D:
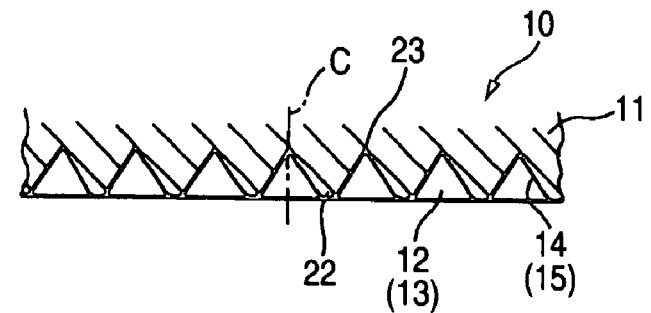

FIG. 4D shows an example, in which the annular grooves 14 of the circular prism 12 are formed by rounding the triangular apexes. The corrugated pattern of the annular grooves 14 in this case is composed of ridges 20 having a semicircular section and troughs 21 having a V-shaped section.

As has been described hereinbefore, the shape of the prism should not be limited to the triangular section but can be varied, and is properly selected according to the utilizing purpose in view of the molding properties and the condensation.

Here is described another modification of the circular prism 12 of the prism sheet 10.

Figure 5A:
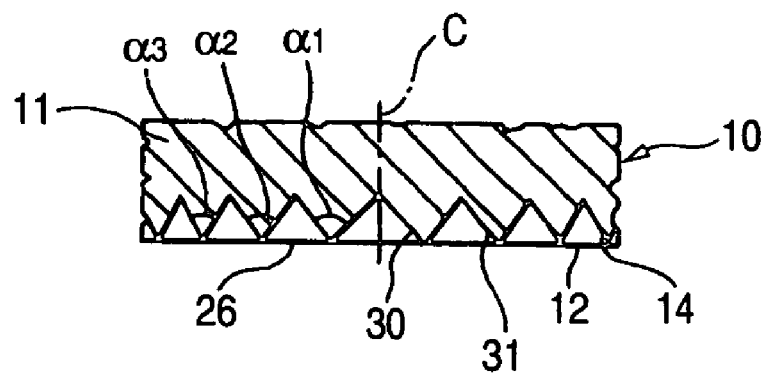
FIGS. 5A and 5B present sectional views of the circular prisms of examples in which the prisms are set in different modes.
Figure 5B:
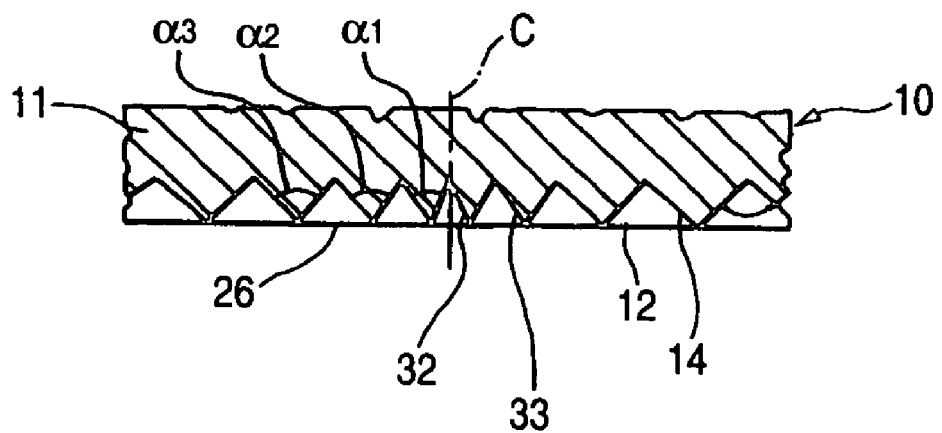

FIGS. 5A and 5B present sections showing other modifications of the circular prism.

As shown in FIG. 5A, the annular grooves 14 of this modification are sequentially reduced in their apex angles in the radial direction from the center axis C. Specifically, the apex angle formed between a trough 30 and an adjoining trough 31 is designated by $\alpha 1$, and the apex angles closer to the center axis C are sequentially designated by $\alpha 1, \alpha 2, \alpha 3, - - -$, and so on and are given the values of $\alpha 1 > \alpha 2 > \alpha 3 > - - -$, and so on. Here, the apexes of the individual grooves are properly arranged on a bottom face 26 and at the positions in a common plane.

As shown in FIG. 5B, moreover, the annular grooves 14 of another modification are sequentially enlarged in the apex angles in the radial direction from the center axis C. Specifically, the apex angles closer to the center axis C are sequentially designated by $\alpha 1, \alpha 2, \alpha 3, - - -$, and so on, and their values are set by $\alpha 1 > \alpha 2 > \alpha 3 > - - -$, and so on. The apexes of the individual grooves of this case are properly arranged on the bottom face 26.

Figure 6A:
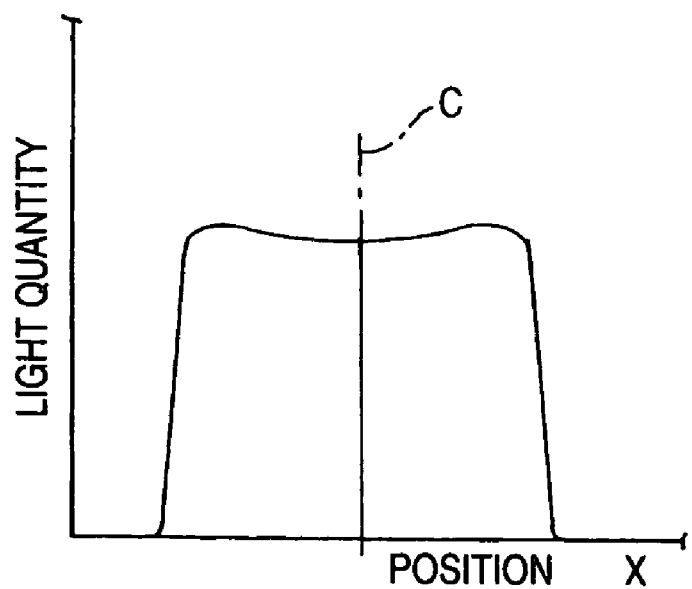
FIGS. 6A and 6B present explanatory diagrams showing graphs of the effect of improving the light quantity distribution according to the modes of the prisms.
Figure 6B:
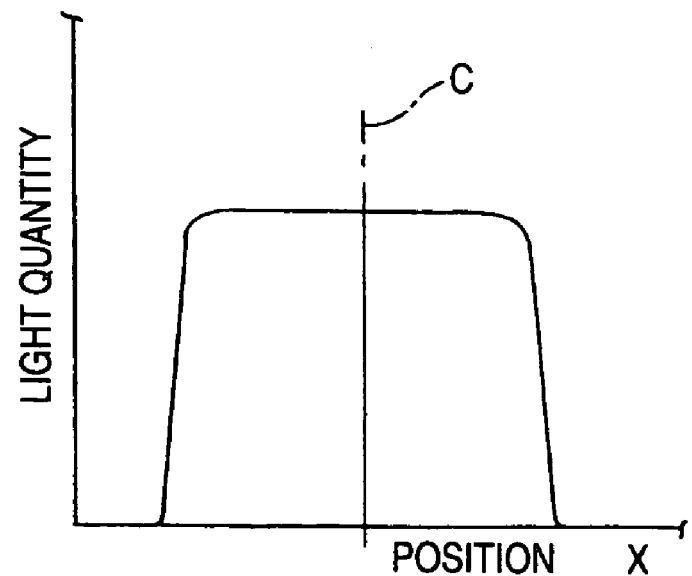

Even in these annular grooves 14, too, in case the vicinity of the center axis C is low, for example, as shown in FIG. 6A, the light quantity distribution can be adjusted to a generally flat shape, as shown in FIG. 6B, by changing the apex angle properly so as to establish a deviation, in which the light quantity near the center axis may become higher.

According to the prism sheet 10 of this embodiment thus far described, the light from the light source 70 is incident on the circular prism 12 and is refracted by the plural annular grooves 14 so that it is evenly diffused in the circumferential direction around the center axis C. The diffused light is guided into the radial prism 13 and is evenly diffused in the radial direction by the straight grooves 15. Therefore, the light emitted through the circular prism 12 and the radial prism 13 has a generally flat light quantity distribution. Thus, the light from the light source can be evenly distributed in its quantity without causing no uneven light quantity around the position of the light source.

Moreover, the prism sheet 10 is integrated with the circular prism 12, the radial prism 13 and the transparent substrate 11. As compared with the case in which the plural optical members are adhered to each other, therefore, the joint interfaces can be reduced to prevent the attenuation of light due to useless reflection/scattering thereby to improve the light utilizing efficiency. As a result, the reduction in the quantity of transmitted light can be suppressed to reduce the power consumption of the display device when this device is combined with the liquid crystal panel or the light.

Because of the integral structure of the prism sheet 10, moreover, the number of steps at the manufacturing time can be reduced, and the deviation in the assembly plane or the optical axis can be eliminated at the time when the prism sheet 10 is assembled with another member, so that the assembling works can be simplified.

According to the prism sheet 10 of this embodiment, moreover, the apexes of the corrugated pattern in the plane having the circular prism 12 formed therein, and the apexes of the corrugated pattern in the plane having the radial prism 13 formed therein are arranged in planes parallel to each other. Therefore, this prism sheet 10 is neither inclined nor displaced, when assembled with another member, with respect to the member on the partner side, so that the light from the light source can be precisely deflected.

Here in the circular prism 12 of the prism sheet 10 of this embodiment, the apex angle of the prism is fixed, and the arrangement pitch of the annular grooves 14 in the radial direction is fixed. As a result, the effect of diffusing the light from the light source by the annular grooves 14 can be made versatile for the various kinds of light sources. In short, the effect obtained is that any light source can be substantially homogenized in the distribution of the quantity of transmitted light.

Second Embodiment

A prism sheet of the second embodiment of the invention is described with reference to FIG. 7 and FIG. 8. In the following description, the same or equivalent portions as or to those of the first embodiment are omitted or simplified in their description by designating them by the common reference numerals.

Figure 7:
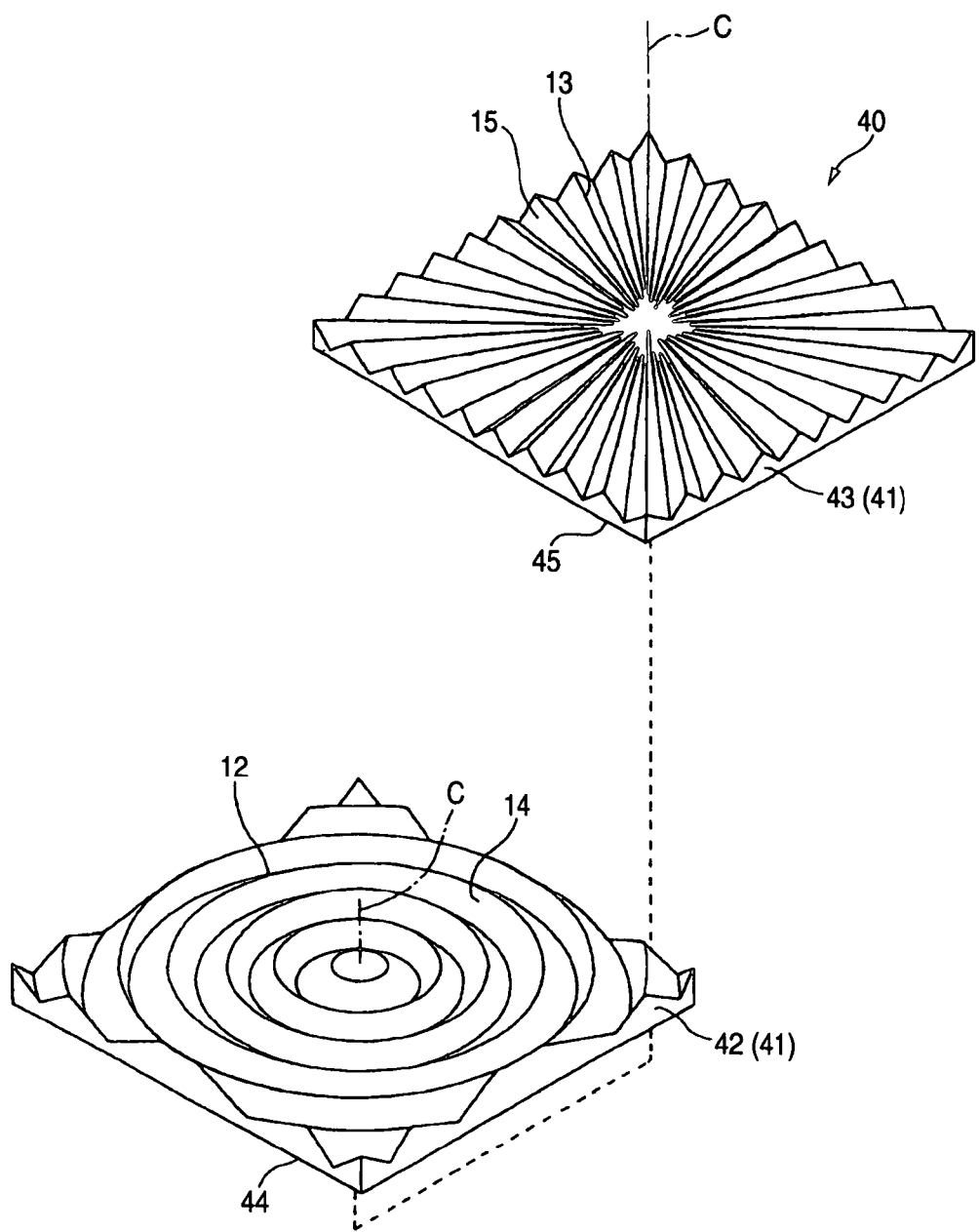
FIG. 7 is an exploded perspective view showing a second embodiment of the prism sheet according to the invention.
Figure 8:
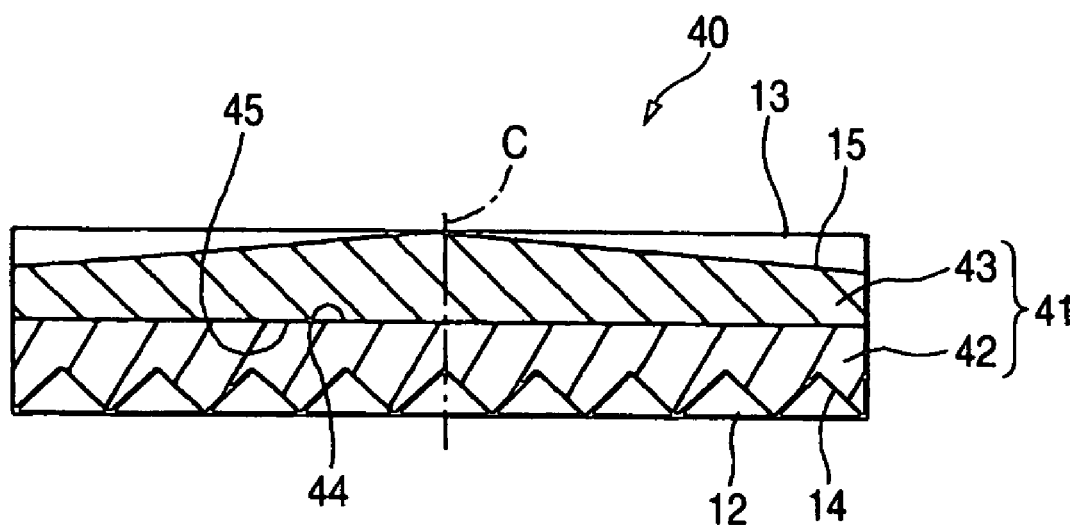
FIG. 8 is a sectional view containing the center axis of the prism sheet shown in FIG. 7.

FIG. 7 is an exploded perspective view showing the second embodiment of the prism sheet according to the invention, and FIG. 8 is a sectional view containing the center axis of the prism sheet shown in FIG. 7.

In a prism sheet 40 of the second embodiment, as shown in FIG. 7, a prism sheet 40 of the second embodiment is composed of two substrates 42 and 43. Of these, the first substrate 42 is provided with the circular prism 12 on its surface, and the second substrate 43 is provided with the radial prism 13 on its surface. These two substrates 42 and 43 are laid on each other at the backs (i.e., the faces having no prism).

As shown in FIG. 8, the jointed face or the upper face of the first substrate 42 is a flat face 44, and the jointed face or the lower face of the second substrate 43 is a flat face 45. Moreover, the prism sheet 40 is integrally formed by jointing the two flat faces 44 and 45 by an adhering or depositing method.

According to the prism sheet 40 of this embodiment, the first substrate 42 having the circular prism 12 formed and the second substrate 43 having the radial prism 13 are integrated by jointing them by the adhering or depositing means. As a result, the manufacture of the circular prism 12 and the manufacture of the radial prism 13 can be divided so that their shapes can be easily modified individually and arbitrarily. Moreover, prisms of many kinds of shapes can be prepared, and their desired shapes can be selected and combined according to the using purpose thereby to improve the versatility.

Here, the circular prism 12 and the radial prism 13 can be modified into the aforementioned individual modifications. For example, the structure may be modified such that both the two prisms of the circular prism 12 and the radial prism 13 are arranged to have their prism lenses opposed to the light source. This case can also achieve effects like the aforementioned ones.

Third Emboidment

Figure 9:
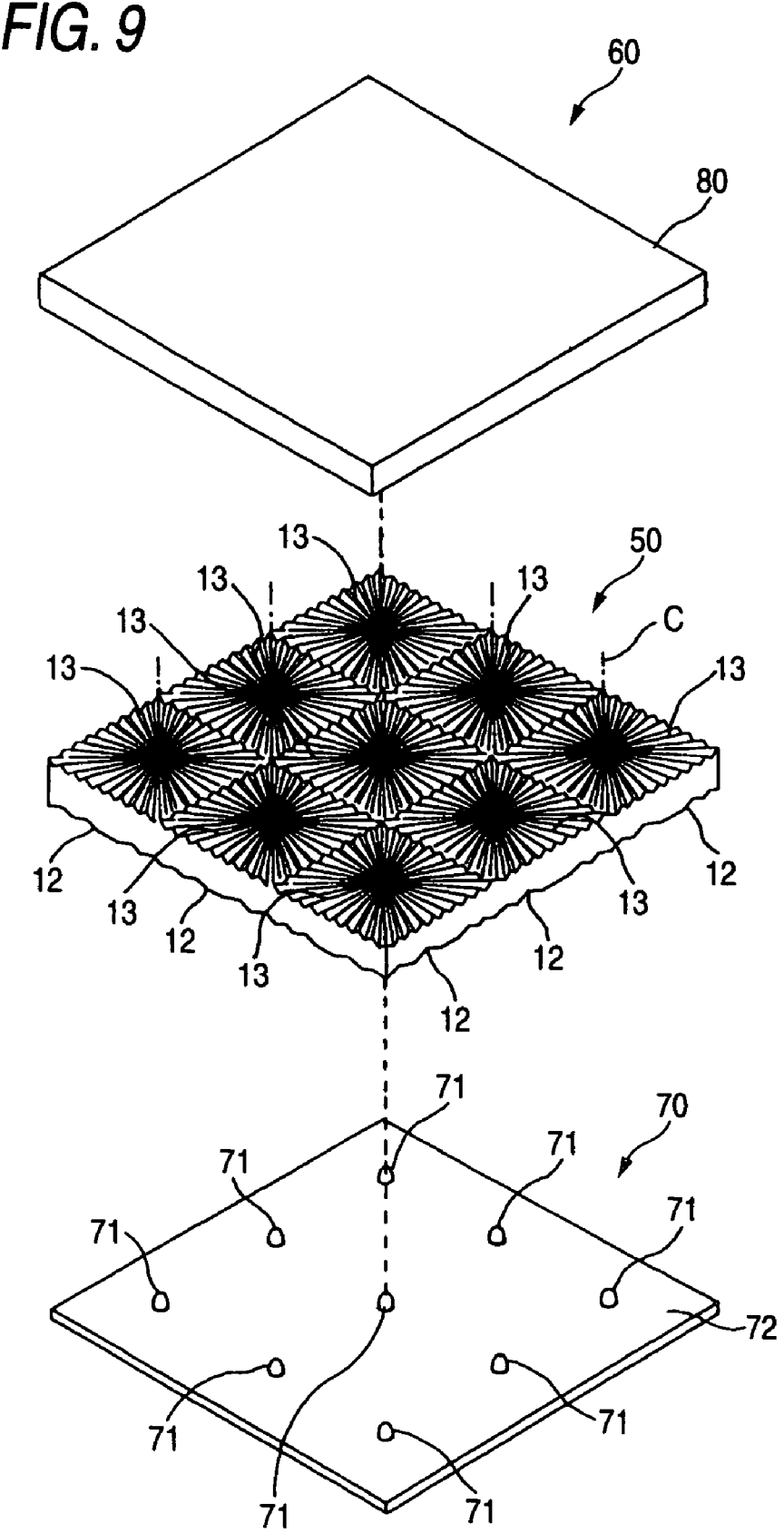
FIG. 9 is a sectional view of a display device using the prism sheet according to the invention.

Next, here are described a prism sheet of the third embodiment of the invention and a display device using the prism sheet with reference to FIG. 9.

FIG. 9 is an exploded perspective view of a display device using the prism sheet according to the invention.

In a prism sheet 50 of the third embodiment, as shown in FIG. 9, a plurality of pairs (i.e., nine pairs in the shown example) of circular prisms 12 and radial prisms 13 are so formed on the back and surface of a transparent substrate 51 that their center axes C are aligned with one another.

This prism sheet 50 is sandwiched between the light source 70 and a liquid crystal panel 80 acting as the transmission type optical modulation array thereby to construct a display device 60. In the light source 70, LEDs 71 as the light emitting elements are so individually arranged on a substrate 72 with their center axes C aligned with one another as correspond to the pairs of the circular prisms 12 and the radial prisms 13. The liquid crystal panel 80 is arranged over the prism sheet 50 so that it is irradiated through the prism sheet 50 with the lights from the individual LEDs 71. Here, the pairs of the circular prisms 12 and the radial prisms 13 should not be limited to those of the shown example but may be arbitrary.

According to the display device 60 using the prism sheet 50 of this embodiment, the lights from the plural LEDs 71 arranged in plurality are incident from the individual corresponding circular prisms 12 on the back of the prism sheet 50 and are refracted and diffused in the individual annular grooves 14. The lights diffused are diffused on the surface of the prism sheet 50 by the straight grooves 15 of the individually corresponding radial prisms 13 so that they irradiate the liquid crystal panel 80. As a result, an even light quantity distribution without any periodicity of the intensity of the transmitted light can be obtained when the lights pass through the annular grooves of the circular prisms 12 and are emitted from the straight grooves of the radial prisms 13. As a result, the light from the light source can be given an even optical distribution without any deviation in the light quantity around the light source position.

Moreover, the direction of the prisms of the prism sheet 50 is different from the orthogonal arrangement mode of liquid crystal cells or the like so that no Moire fringe occurs on the pixels of the liquid crystal panel 80 to cause no drop in the display quality, and so that the uneven light quantity of the screen due to the deterioration in the flatness of the display unit can be avoided. Moreover, the lights from the light source or the optical guide plate are condensed evenly and efficiently to improve the light utilizing efficiency. Thus, it is possible to provide the display device capable of improving the display brightness of the liquid crystal panel without deteriorating the display quality. Here, the actions and effects thus far described can be obtained even in case the display device 60 is constructed by using the prism sheets 10 and 40 of the individual embodiments including the individual modifications.

Fourth Embodiment

Figure 10:
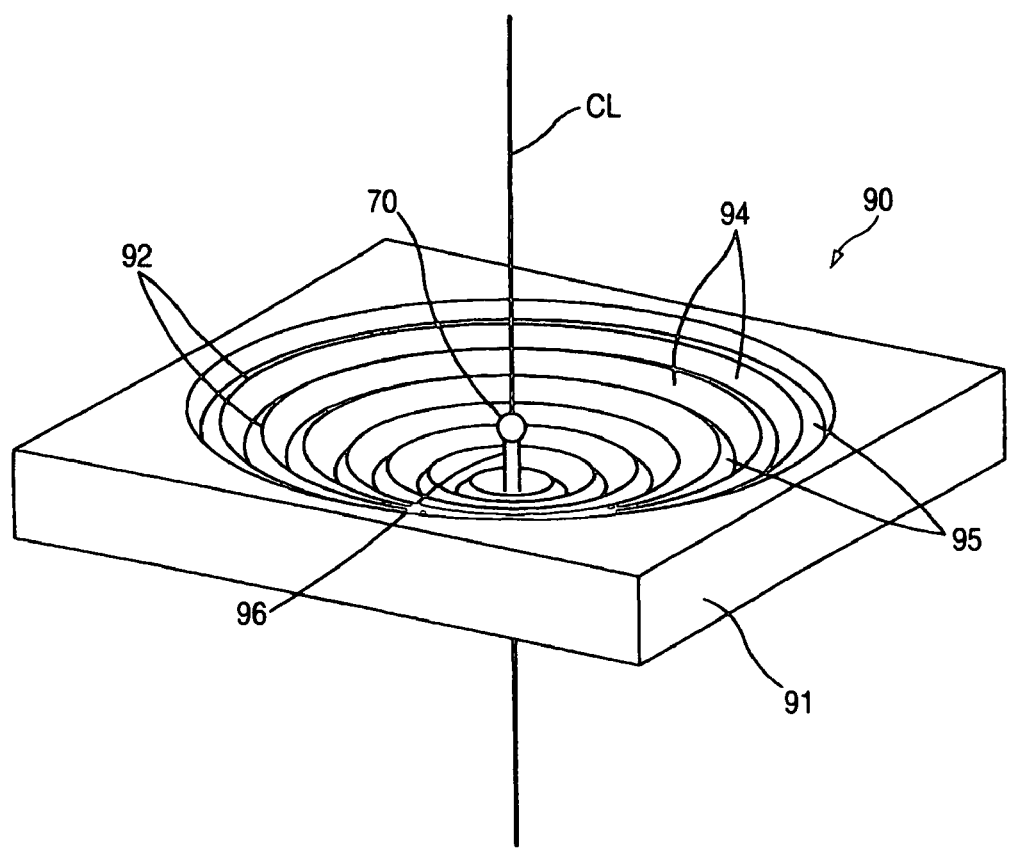
FIG. 10 is a perspective view of the state, in which a light source is attached to the reflecting member of a display device according to the invention.
Figure 11:
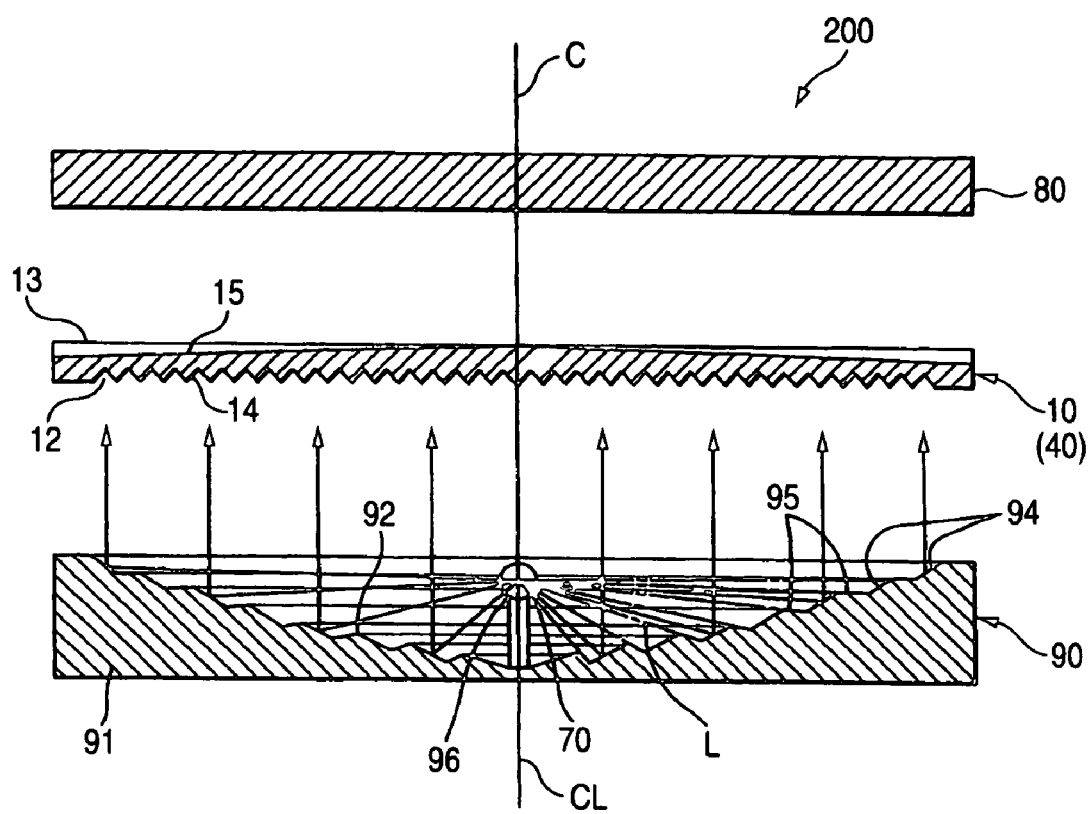
FIG. 11 is a longitudinal section of an essential portion of the display device provided with the reflecting member shown in FIG. 10.

Here is described a display device of another embodiment using the prism sheet of the invention with reference to FIG. 10 and FIG. 11.

FIG. 10 is a perspective view of the state, in which the light source is attached to the reflecting member of a display device according to the invention, and FIG. 11 is a longitudinal section of an essential portion of the display device provided with the reflecting member shown in FIG. 10. In the following description, the same or equivalent portions as or to those of the third embodiment are omitted or simplified in their description by designating them by the common reference numerals.

In a reflecting member 90, as shown in FIG. 10, on the surface of a curvilinearly recessed substrate 91, there are alternately formed inner annular slopes or inner reflecting faces 94 and outer annular slopes 95 concentrically with respect to a center line CL, thereby to form a corrugated pattern on the substrate 91. The boundaries between the inner annular slopes 94 and the outer annular slopes 95 are annular ridgelines 92. From the center of the recessed faces, there is erected a rod-shaped stay 96, by which the light source 70 is supported and arranged on the center line CL. The circular reflecting faces (or the inner annular slopes) 94 are shaped to reflect the light emitted from the light source 70, substantially in collimated lights. The outer annular slopes 95 are formed substantially in parallel with an optical path L of the light emitted from the light source 70, so that they do not receive the light emitted from the light source 70.

The reflecting member 90 is formed to have the circular reflecting faces 94 by evaporating aluminum or the like, for example, on the surface of a sheet material, which is made of plastics or the like to have the inner annular slopes 94 and the outer annular slopes 95 alternately in plurality. The reflecting member 90 reflects the light incident on the circular reflecting faces 94, efficiently in collimated lights. The angle or shape of the specific circular reflecting faces (or the inner annular slopes) 94 are different according to the kind or position of the light source and is optimized to match those conditions.

A parabolic face having a light source arranged at the position of a focal point is generally known as the reflecting face for reflecting the light from the light source into collimated lights. By arraying the plural circular reflecting faces 94 concentrically, however, the thickness can be made far smaller than that of the single parabolic face so that the display device can be small-sized. In other words, the collimated lights can be produced over a wider range. This reflecting member 90 can be formed not only with the grooves but by folding a thin plate.

In a display device 200 using the reflecting member 90, as shown in FIG. 11, the prism sheet 10 is assembled between the light source 70 and the liquid crystal panel 80 acting as the transmission type optical modulation array, and the reflecting member 90 is arranged on the opposite side of the prism sheet 10 with respect to the light source 70. The center line CL of the reflecting member 90 is aligned with the center axis C of the prism sheet 10.

According to the display device 200 of this embodiment, the light from the light source 70 is incident on the back of the prism sheet 10 from the individually corresponding annular prism 12 and is refracted and diffused on the individual annular grooves 14. The lights are diffused on the surface of the prism sheet 10 by the straight grooves 15 of the individually corresponding radial prisms 13 so that they irradiate the liquid crystal panel 80. The light emitted from the light source 70 in the opposite direction of the prism sheet 10 is reflected into collimated lights on the plural circular reflecting faces 94 of the reflecting member 90 so that the lights become incident as the parallel beams normal to the prism sheet 10 on the prism sheet 10. On the other hand, the lights reflected on the back of the prism sheet 10 are also made incident on the prism sheet 10 by the reflecting member 90. Thus, the reflected lights from the reflecting member 90 are incident on the back of the prism sheet 10 from the circular prisms 12 and are refracted and diffused. Moreover, the diffused lights are diffused on the surface of the prism sheet 10 by the radial prisms 13 so that they irradiate the liquid crystal panel 80.

As a result, the light from the light source 70 is mostly incident on the prism sheet 10 so that the light incident on the prism sheet 10 is increased to irradiate the liquid crystal panel 80 efficiently so that the display brightness of the liquid crystal panel 80 is drastically improved. As a result, the effects obtained are similar to those of the case, in which the brightness of the light source 70 is increased. By condensing the light from the light source 70 or the optical guide plate evenly and efficiently and by making the condensed light on the liquid crystal layer thereby to improve the light utilizing efficiency, the display device 60 having the improved display brightness of the liquid crystal panel can be obtained without deteriorating the display quality.

Here, the aforementioned actions and effects can also be obtained even in case the display device is constructed by using the prism sheets 10 and 40 of the individual embodiments including the individual modifications.

Fifth Emboidment

Figure 12:
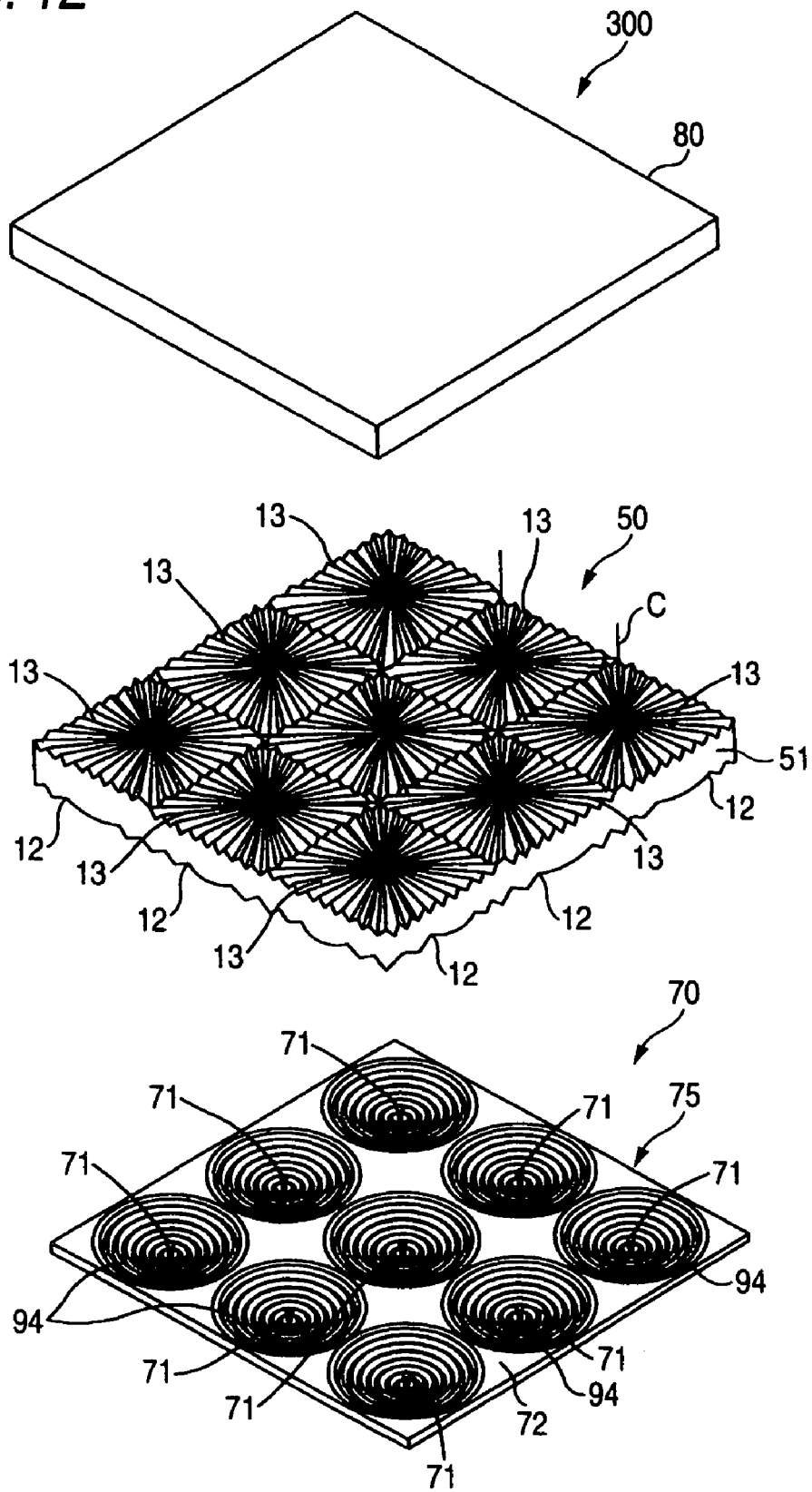
FIG. 12 is an exploded perspective view of another display device according to the invention.
Figure 13:
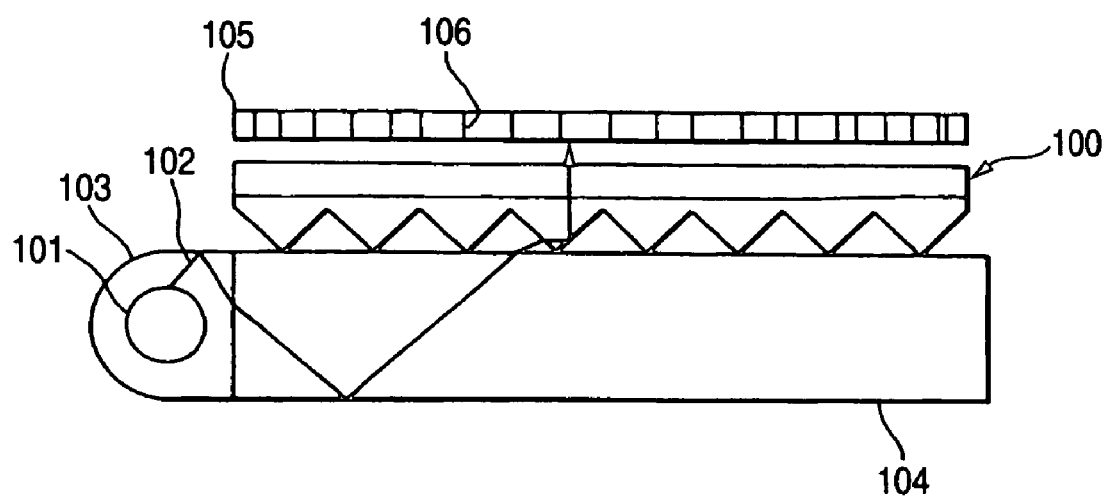
FIG. 13 is a sectional view of a prism sheet of the related art.

Here is described a display device of still another embodiment using the prism sheet of the invention with reference to FIG. 12.

FIG. 12 is an exploded perspective view of a display device according to the invention. In the following description, the same or equivalent portions as or to those of the third embodiment are omitted or simplified in their description by designating them by the common reference numerals.

As shown in FIG. 12, a display device 300 is provided with the prism sheet 50, in which a plurality of pairs (i.e., nine pairs in the shown example) of circular prisms 12 and radial prisms 13 are formed to have their center axes C aligned with one another.

This prism sheet 50 is sandwiched between the light source 70 and the liquid crystal panel 80 acting as the transmission type optical modulation array thereby to construct the display device 300. In the light source 70, the LEDs 71 as the light emitting elements are so individually arranged on a substrate 72 with their center axes C aligned with one another as correspond to the pairs of the circular prisms 12 and the radial prisms 13. On the surface of the substrate 72, the plural circular reflecting faces 94 are arranged concentrically around the individual LEDs 71, so that the corrugated pattern is formed in the substrate 72. The substrate 72 acts as a reflecting member 75 for reflecting the light incident on the circular reflecting faces 94 having mirror surfaces, efficiently into collimated lights. As a result, the lights from the individual LEDs 71 irradiate the prism sheet 50, and the light irradiated from the individual LEDs 71 in the opposite direction of the prism sheet 50 and the lights reflected on the back of the prism sheet 50 are reflected into parallel beams by the circular reflecting faces 94 thereby to irradiate the prism sheet 50 in the normal directions. Here, the pairs of the circular prisms 12 and the radial prisms 13 should not be limited to those of the shown example but may be arbitrary.

The circular reflecting faces of FIG. 12 are drawn so far that the circles come into contact with the adjoining circles, but are formed continuously without any clearance to the adjoining boundaries like the overlaying prism sheet.

According to the display device 300 of this embodiment, the lights from the plural LEDs 71 arranged in plurality and the reflected lights reflected by a reflecting member 75 (or the circular reflecting faces 94) are incident from the individual corresponding circular prisms 12 on the back of the prism sheet 50 and are refracted and diffused in the individual annular grooves 14. The lights diffused are diffused on the surface of the prism sheet 50 by the straight grooves 15 of the individually corresponding radial prisms 13 so that they irradiate the liquid crystal panel 80. As a result, an even light quantity distribution of a high brightness but without any periodicity of the intensity of the transmitted light can be obtained to improve the display brightness of the liquid crystal panel.

Here, the prism sheet of the invention should not be limited to the foregoing individual embodiments but can be suitably modified and improved. For example, it is preferred that the number of the corrugated patterns in the annular grooves and in the straight grooves is properly set considering the distribution or the like of the distribution of the lights emitted from the light source. Moreover, the light source should not be limited the LED but can be exemplified by spotted, disc-shaped or spherical shapes.

What is claimed is:

1. A display device comprising:
a light source;
a prism sheet for deflecting and emitting light introduced into a transparent substrate, comprising:
   a transparent substrate;
   a circular prism formed on the transparent substrate, the circular prism having a plurality of annular grooves arrayed concentrically from a center axis; and
   a radial prism formed on the transparent substrate, the radial prism having a plurality of straight grooves arrayed radially from the center axis;
   wherein the center axis is aligned with an optical axis of the light source;
an array of transmission type optical modulation elements arranged on a light emission side of the prism sheet for modulating light emitted from the prism sheet; and
a reflecting member including a plurality of circular reflecting faces arrayed concentrically from a center line for reflecting light from the light source arranged on the center axis, on the circular reflecting faces thereby to introduce the reflected lights into the prism sheet;
wherein the reflecting member is arranged on an opposite side of the prism sheet with respect to the light source;
wherein the reflecting member includes inner annular slopes and outer annular slopes for forming a plurality of annular ridgelines concentrically from a center of a curvilinearly recessed substrate,
wherein the inner annular slopes are formed to reflect the light emitted from the light source into substantially collimated lights, and
wherein the outer annular slopes are formed substantially in parallel with an emission optical path from the light source.

* * * * *